(12) United States Patent
Hu

(10) Patent No.: US 8,320,308 B2
(45) Date of Patent: Nov. 27, 2012

(54) PARALLEL DATA SERVICES AND SPECTRUM SENSING WITH COGNITIVE CHANNEL SWITCHING IN A WIRELESS AREA NETWORK

(75) Inventor: Wendong Hu, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 715 days.

(21) Appl. No.: 12/267,315

(22) Filed: Nov. 7, 2008

(65) Prior Publication Data

US 2009/0147741 A1 Jun. 11, 2009

Related U.S. Application Data

(60) Provisional application No. 60/986,194, filed on Nov. 7, 2007.

(51) Int. Cl.
*H04W 4/00* (2009.01)
*H04J 1/00* (2006.01)
*H04J 3/00* (2006.01)

(52) U.S. Cl. ........ 370/329; 370/330; 370/341; 370/343; 370/345

(58) Field of Classification Search .................. 370/329, 370/330, 341, 343, 345
See application file for complete search history.

(56) References Cited

U.S. PATENT DOCUMENTS

| | | | |
|---|---|---|---|
| 6,584,175 B1 * | 6/2003 | Kibria et al. ................. | 379/1.03 |
| 7,451,350 B2 * | 11/2008 | Cherny et al. .................... | 714/32 |
| 7,549,156 B2 * | 6/2009 | Li et al. .......................... | 725/111 |
| 7,756,058 B2 * | 7/2010 | Cordeiro et al. ............... | 370/252 |
| 2004/0180697 A1 * | 9/2004 | Lee et al. ....................... | 455/561 |
| 2006/0158570 A1 * | 7/2006 | Arora et al. .................... | 348/731 |
| 2007/0064840 A1 * | 3/2007 | Kang et al. ..................... | 375/340 |
| 2008/0080604 A1 * | 4/2008 | Hur et al. ....................... | 375/224 |
| 2008/0101284 A1 * | 5/2008 | Buchwald et al. ............. | 370/329 |
| 2008/0181337 A1 * | 7/2008 | Maxim .......................... | 375/340 |
| 2008/0233991 A1 * | 9/2008 | Gillig et al. .................... | 455/519 |
| 2009/0067354 A1 * | 3/2009 | Gao et al. ....................... | 370/310 |
| 2010/0165913 A1 * | 7/2010 | Ang et al. ...................... | 370/328 |
| 2010/0232365 A1 * | 9/2010 | Lu et al. ......................... | 370/329 |
| 2010/0296404 A1 * | 11/2010 | Quadri et al. ................. | 370/252 |
| 2011/0032892 A1 * | 2/2011 | Bahl et al. ...................... | 370/329 |
| 2011/0090853 A1 * | 4/2011 | Chandramouli et al. ..... | 370/329 |

* cited by examiner

*Primary Examiner* — Chi Pham
*Assistant Examiner* — Farah Faroul
(74) *Attorney, Agent, or Firm* — Hogan Lovells US LLP

(57) ABSTRACT

Data service transmission interruption is minimized by initially setting up a cluster of channels to transmit data services. As the need arises to switch channels due to the detection of an incumbent signal, the data services can be switched with substantially no delay. A group of channels from those available in a wireless network are chosen to form a cluster of channels. Each channel within the cluster is set up to convey data services with channel parameters being stored. A first operating channel is chosen from among the cluster of channels to transmit the data services. While the data services are being transmitted on the first operating channel, out-of-band spectrum sensing occurs on the other channels. Upon predetermined criteria a channel switch occurs. As each channel has already been set up the necessary channel parameters are retrieved from storage and restored without data service interruption.

19 Claims, 7 Drawing Sheets

PARALLEL DATA SERVICES AND SPECTRUM SENSING WITH COGNITIVE CHANNEL SWITCHING IN A WIRELESS AREA NETWORK

RELATED APPLICATION

The present application relates to and claims the benefit of priority to U.S. Provisional Patent Application No. 60/986,194 filed Nov. 7, 2007, which is hereby incorporated by reference in its entirety for all purposes as if fully set forth herein.

BACKGROUND OF THE INVENTION

1. Field of the Invention

Embodiments of the present invention relate, in general, to wireless network communications and particularly to parallel spectrum sensing and data services in wireless network communications.

2. Relevant Background

Wireless communication continues to be one of the greatest technology achievements. As communication systems continue to evolve and advance the spectral use of any one frequency resource has become increasingly important. As more and more frequency bands become occupied an emphasis has arisen to efficiently control and use each frequency resource.

In addition to efficiently controlling and using frequency bands assigned for wireless communication, the opportunity to use excess capacity of existing bands also exists. It is well known that television ("TV") broadcast bands are, at any one instant, only utilized to 40% of their capacity. The remaining 60% can be used for other applications, services and spectral usage providing that the new signals do not interfere with the incumbent signal. Additionally the transition of analog TV signals to a digital format essentially opens the 700 MHz band for wireless use.

To use existing frequency bands for wireless communication, the incumbent signal must be sensed. Thus periodically a quiet time is established to determine whether the frequency band, also referred to herein as a channel, can continue to be used for other uses such as data services. One method for detecting incumbent signals is known to one skilled in the art as serial scheduling.

FIG. 1 shows a prior art depiction of a single channel in a wireless network being used for data services employing serial scheduling. In this depiction, a single channel 110 is being used to convey data services 120 as well as incumbent signals. Periodically sensing occurs to search for and detect, for example, an IEEE 802.22 Task Group 1 beacon 130 (also referred to herein as a TG1 beacon). A TG1 beacon essentially foretells the vicinity of an incumbent signal generator. While not the actual incumbent signal, the beacon protects another signal such as a FCC Part 74 Wireless Microphone signal that is or may be using the channel 110. After detection of the beacon 130 a quiet period 140 occurs to detect and capture the Master Super Frame ("MSF") 150 of the beacon. The length of the quiet period 140 depends on what type, or the number, of MSFs being captured for the beacon. The capture of MSF1 can take 40 ms while capturing MSF1+MSF2+MSF3 can take as long as 100 ms. During this quiet/capture period, data services associated with the channel are interrupted. If during the quiet period the MSF(s) for that beacon is not captured, thus indicating that an incumbent signal is not present, the data services 120 are reestablished in a serial manner until the next beacon 130 is detected and the next quiet period 140 begins. As more MSFs 150 are captured, the interruption increases; however, the most significant interruption occurs when an incumbent signal (TG1 Beacon's MSF) is detected requiring the data services to be shifted to another channel.

FIG. 2 shows a prior art depiction of channel switching in a wireless network in which an incumbent signal is detected on a first channel. As in FIG. 1, FIG. 2 shows a channel 210 carrying data services 220. While the channel is carrying the data services 220 spectrum sensing occurs to detect a beacon 230. Upon detection of the beacon 230 a quiet period begins 240 interrupting the transmission of the data services 220. During the first quiet period 240 shown in FIG. 2 a beacon payload (MSF) is detected foretelling the presence of an incumbent signal 245. Accordingly the data services 220 must switch to another channel 270.

The switch to a new channel cannot occur immediately. At least two steps must occur to establish a new channel. First, data services 220 associated with the first channel 210 must initiate the move 260 to another channel and a new channel must be identified. Second, the newly identified channel 270 must be setup 280 to receive the data services 220. Once the new channel 270 is prepared, data services are reestablished and continue to be transmitted until another beacon payload is detected.

While the channel changing process occurs, data services are interrupted. The channel move initiation time associated with the first channel can take up to 2000 ms and the channel setup on the new channel can also take up to 2000 ms. Thus changing channels due to the detection of an incumbent signal can result in an interruption of services in excess of 4 seconds. Additionally, channel changes are not rare occurrences. While the new channel is selected because of its ability to carry the data services, it too carries incumbent signals. Thus while the new channel will be able to initially carry the data services, it is likely that the same issues forcing the initial channel change will occur again. Under the current serial scheduling techniques known in the prior art, each time a channel change is indicated, data services are interrupted for a significant period of time.

SUMMARY OF THE INVENTION

A system and method for cognitively switching channels from among a cluster of available channels in a wireless network is disclosed by way of example hereafter. Embodiments of the present invention capitalize on the opportunity to utilize existing frequency bands to transmit data services. While certainly the concepts presented herein are equally applicable to dedicated channels for wireless communication, the present invention enables data services to be efficiently transmitted on existing frequency bands such as those used for TV transmission.

According to one embodiment of the present invention, data service transmission interruption is minimized by initially setting up a cluster of channels to transmit data services. As the need arises to switch channels due to the detection of an incumbent signal, the data services can be switched with substantially no delay. According to one embodiment, a group of channels from those available in a wireless network are chosen to form a cluster of channels. Each channel is set up to convey data services and the channel parameters are then stored on storage medium.

A first operating channel is chosen from among the cluster of channels to transmit the data services. While the data services are being transmitted on the first operating channel, spectrum sensing occurs on the other channels within the channel cluster. Upon expiration of a channel maintenance interval or a channel interference interval, a channel switch occurs. As each channel has already been set up to accommodate data services, the necessary channel parameters are retrieved from storage and resumed on the new operational channel. Spectrum sensing can then begin on the previous operational channel while data services are continually transmitted on the new operational channel.

A system for cognitive channel switching from among a cluster of channels in a wireless network, according to one embodiment of the present invention, includes a channel setup module, a spectrum sensing device and a channel switching module. Each of these modules is communicatively coupled together and associated with a cluster of channels. The channel setup module and the channel switching module are also communicatively coupled to a storage medium. Upon the selection of channels to comprise the cluster of channels from those available in the wireless network, each channel is set up for transmission of data services. Channel parameters for each channel in the cluster are stored on the storage medium. As data service transmissions switch from one channel to another, channel parameters are retrieved from the storage medium. The channel parameters are restored in the target channel eliminating the need to accomplish a new channel setup upon each channel switch.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
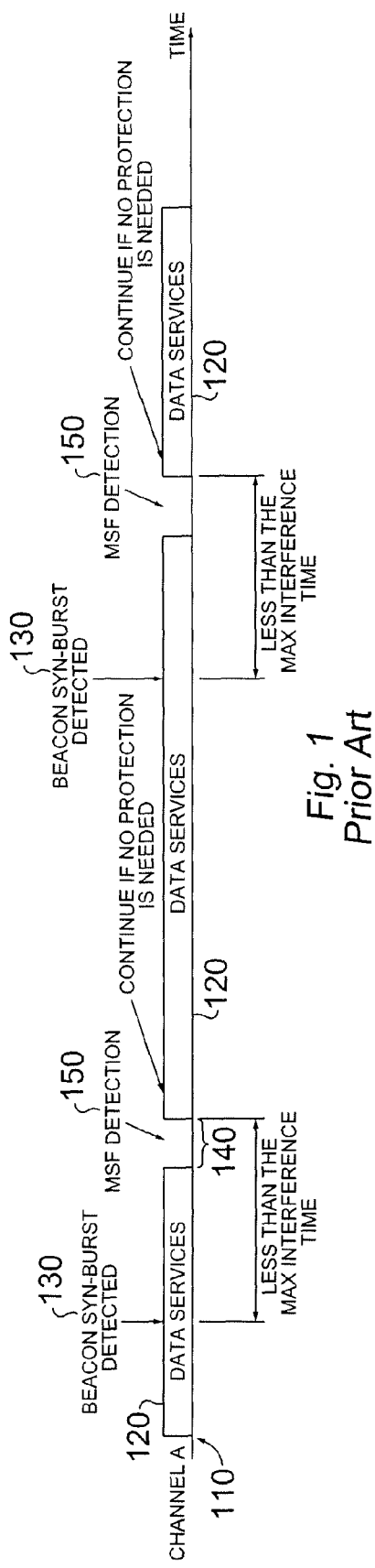
FIG. 1 is a depiction of a single channel in a wireless network being used for data services employing serial scheduling as is known in the prior art.
Figure 2:
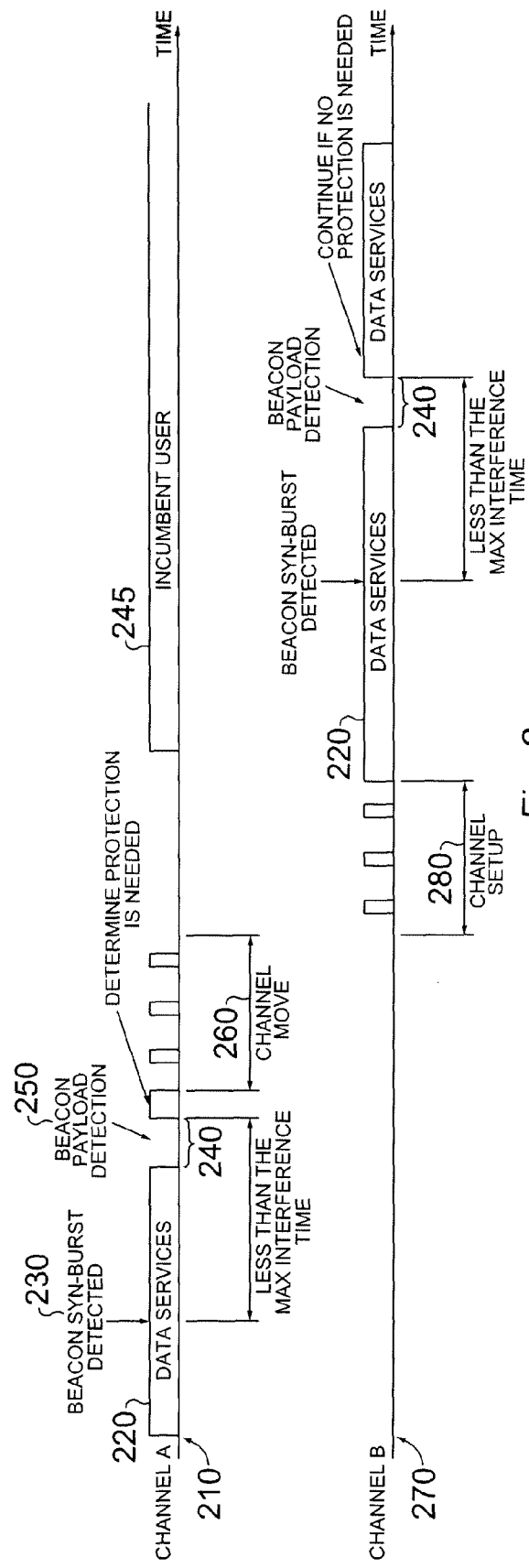
FIG. 2 is a depiction of channel switching in a wireless network from a primary channel in which an incumbent signal is detected to a secondary channel as is known in the prior art.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Figure 3:
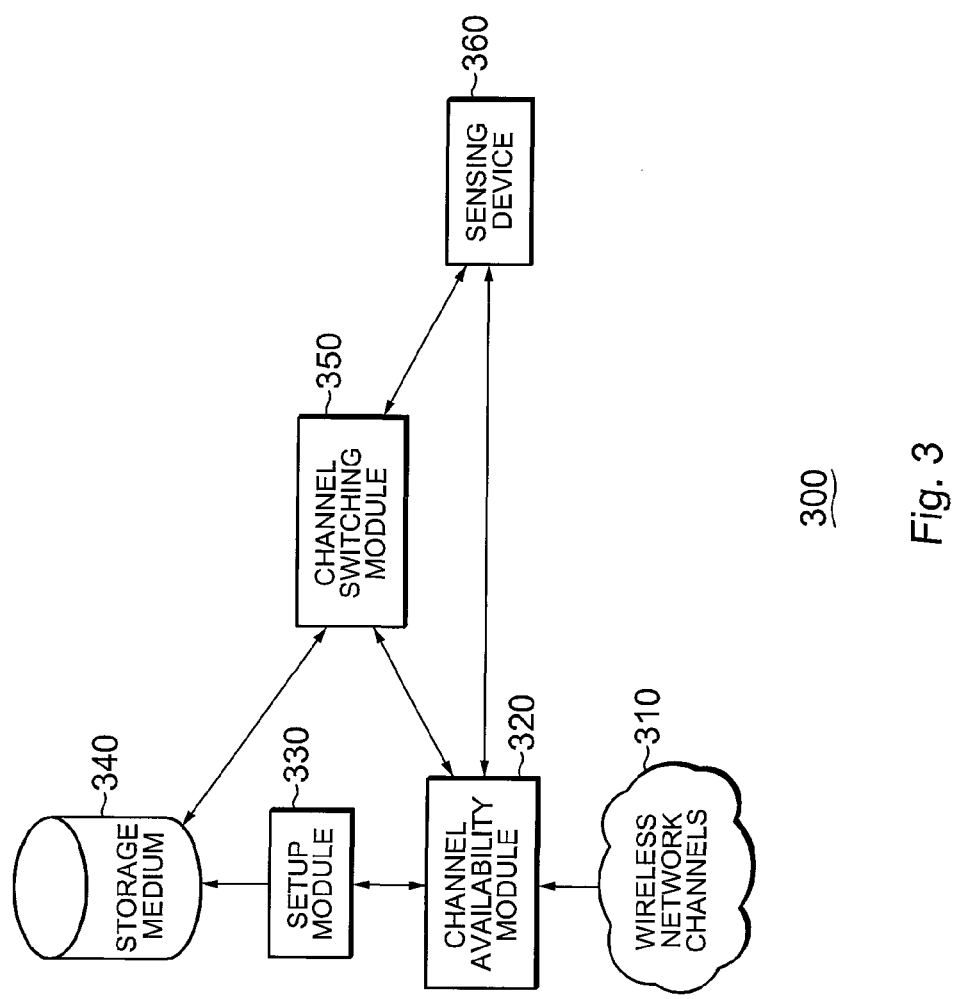
FIG. 3 is a high level block diagram of a system for cognitive channel switching using parallel data services and spectrum sensing according to the present invention

FIG. 3 is a high level block diagram of a system for zero-delay cognitive switching using parallel data services and spectrum sensing. The system 300 comprises a plurality of channels 310 associated with a wireless network, a channel availability check module 320, a setup module 330, a storage medium 340, a channel switching module 350 and a spectrum sensing device 360. From the channels associated with the wireless network the channel availability module 320 checks to determine each channel's availability for data service transmission and from those channels found to be available, the channel availability module 320 forms a cluster of channels.

The channels availability check module 320 then communicates each channel to the channels setup module 330 which thereafter establishes channel parameters for each channel. The setup parameters are stored in a storage medium 340 for later retrieval and use. As one skilled in the art of data storage will recognize, the storage medium may be of several forms including magnetic disk or tape, optical disk, flash drives and the like. In addition the data may be stored on a variety of storage mediums rather than at a single or central location. All of these concepts of data storage are well known and are equally applicable to the various embodiments of the present invention.

The storage medium 340 is also coupled to the channel switching module 350. The channel switching module 350 drives the cognitive switching process and is communicatively coupled to not only the storage medium 340 and the channel availability check module 330 but also the spectrum sensing device 360.

Once a cluster of channels has been selected by the channel availability check module 330 and channel parameters for each channel have been determined by the setup module 330 and stored in the storage medium 340, the channel switching module 350 and the spectrum sensing device 360 work in concert to maintain data service transmission with minimal interruption. According to one embodiment of the present invention, as data services are being transmitted on one channel, spectrum sensing occurs on the other channels within the channel cluster. As the channel actively transmitting data services reaches a point where it must interrupt transmission to sense for incumbent signals, data services are switched to another channel within the cluster of channels. In such a manner spectrum sensing occurs off band and thus eliminates data service transmission interruption.

Figure 4:
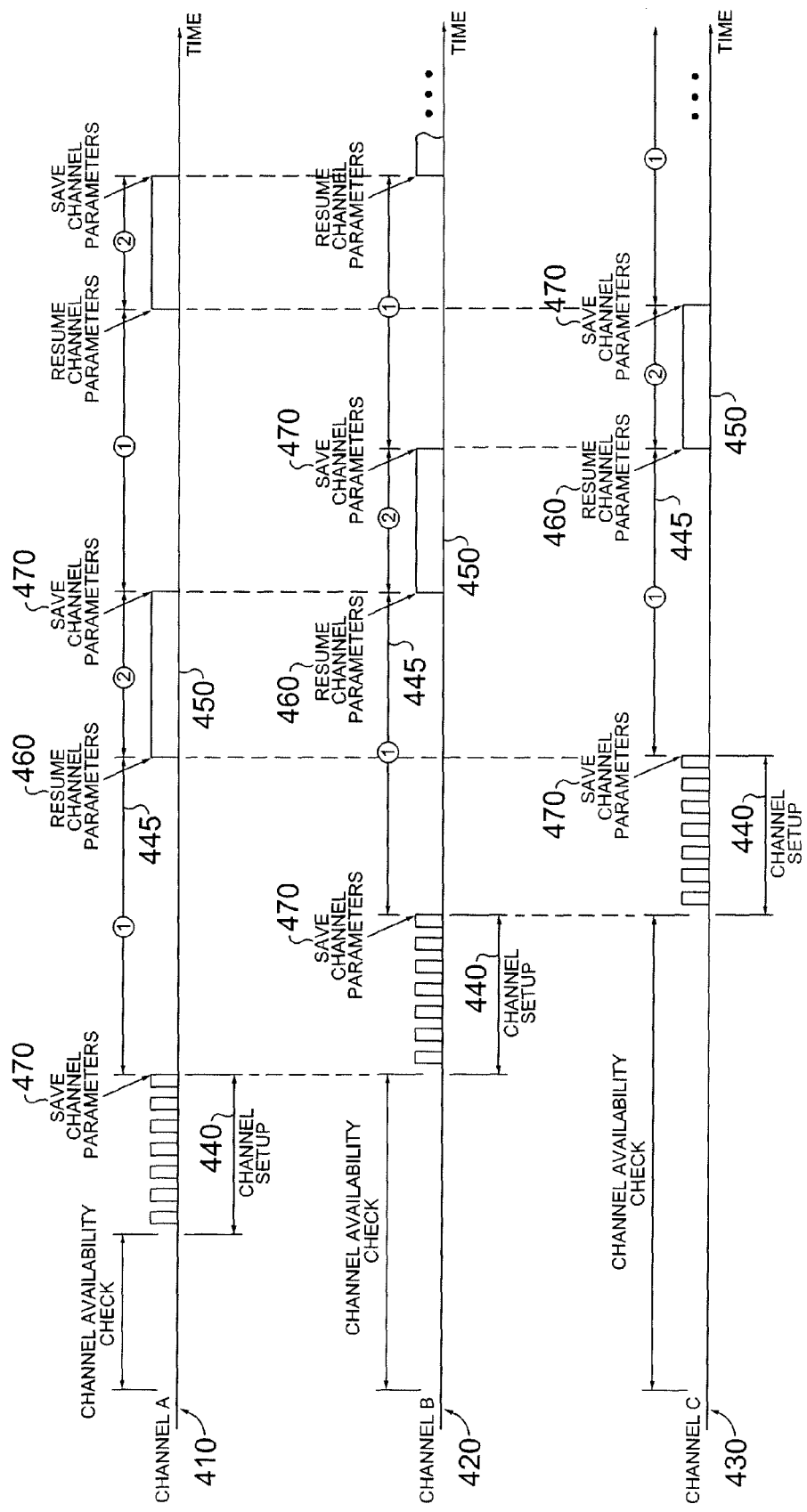
FIG. 4 shows channel setup and zero-delay switching among three channels with cognitive channel switching according to one embodiment of the present invention.

FIG. 4 shows one embodiment of channel setup and zero-delay switching among three channels using parallel data services and spectrum sensing with cognitive channel switching according to the present invention. Channel A 410, channel B 420 and Channel C 430 are selected from a plurality of available channels in a wireless network to form a cluster of channels. While for illustration purposes three channels are depicted, one skilled in the art will recognize that the number of channels within the cluster of channels may vary.

In the example illustrated in FIG. 4, three channels have been identified to comprise the channel cluster. Upon initial selection, each channel 410, 420, 430 is set up 440 by the channel setup module 330 and their respective channel parameters are stored 470. Spectrum sensing 445 thereafter begins on each channel 410, 420, 430 followed by restoring of the channel parameters 460 and data service transmission 450. Note that while channel A 410 is transmitting data 450, channel B 420 and channel C 430 are conducting spectrum sensing operations 445. Each channel must periodically conduct spectrum sensing. During this period data transmissions are interrupted. This period is also associated with the maximum interference interval.

The maximum interference interval is the maximally allowed time interval between the time instance that a wireless operation or service to be protected is detected (sensed) on a certain radio frequency channel and the time instance that the interference operation of a interfering wireless system is terminated on such channel.

According to one embodiment of the present invention, a channel actively transmitting data services switches the data service transmission 450 to another channel within the channel cluster rather than interrupt transmission to conduct spectrum sensing operations 445.

As shown in FIG. 4, just prior to spectrum sensing 445 beginning on channel A, the channel parameters for channel B 420 are retrieved from storage and restored. Once channel B 420 is configured correctly, data service transmission can be switched from channel A 410 to channel B 420 with minimal interruption of services. Indeed the only interruption would be time associated with mechanical (hardware) switching operations which is extensively negligible.

The transmission of data services 450 continues with a zero-delay switching scheme as shown in FIG. 4, according to one embodiment of the present invention. As with the interaction between channel A 410 and channel B 420, the data services transmission switches to channel C 430 as channel B 420 needs to begin spectrum sensing 445.

Figure 5:
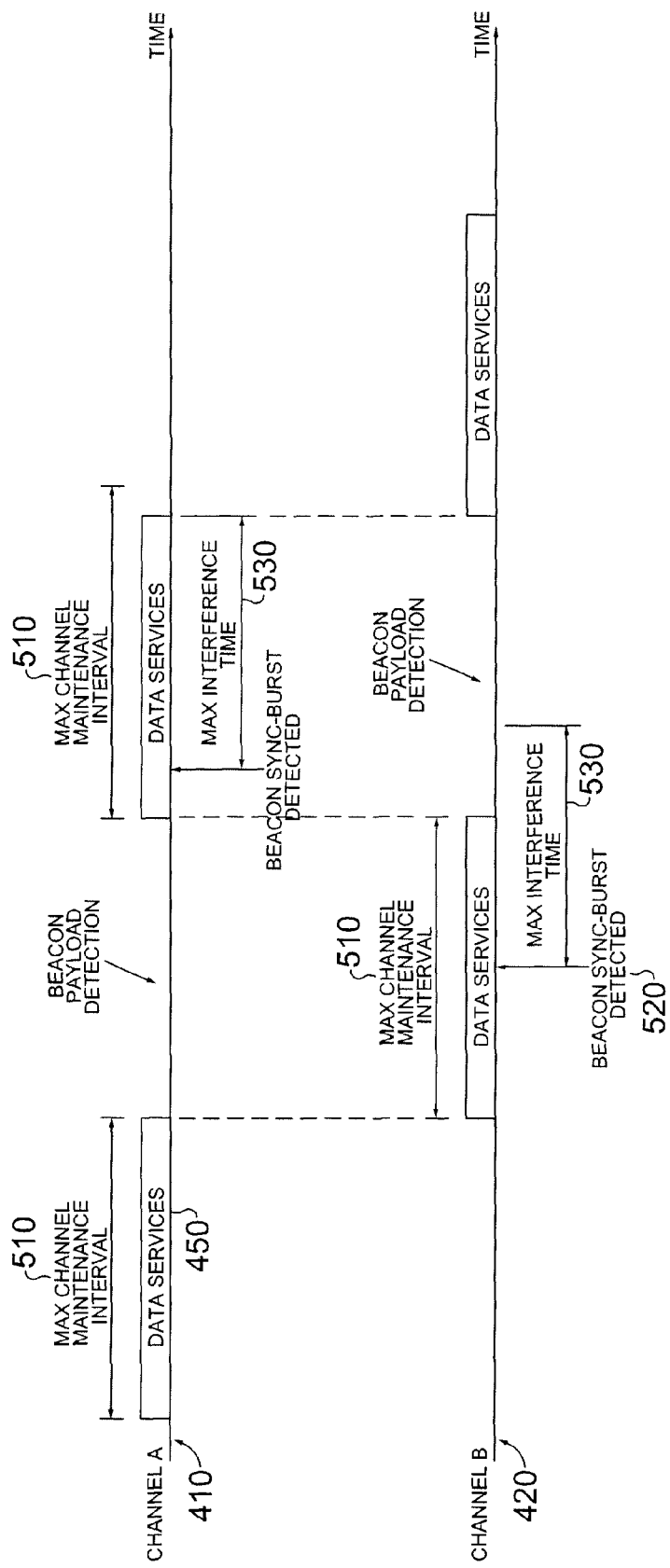
FIG. 5 is a simplified illustration of cognitive channel switching showing the interaction of channel maintenance intervals and interference intervals, according to one embodiment of the present invention.

FIG. 5 shows a simplified depiction of cognitive channel switching between two channels according to one embodiment of the present invention. Data services 450 are being transmitted via a cluster of channels including channel A 410 and Channel B 420. Two criteria drive the determination of when the transmission of data services must be switched from one channel to another. The first criterion is the channel maintenance interval. The channel maintenance window is the maximally allowed time interval between two consecutive channel maintenance operations of a wireless system for a certain radio frequency channel. A channel can transmit data services for a finite period of time before it must conduct channel maintenance. Channel maintenance includes operations that a wireless system performs for a certain radio frequency channel, either periodically or sporadically, so that the operating parameters (such as radio frequency, transmit power, modulation, and timing) are maintained usable to ensure the wireless system's proper operations on such channel. If a channel falls outside of the maintenance interval, new channel parameters must be established via a setup procedure. Thus to prevent multiple setup procedures from occurring, periodic channel maintenance must be performed. The maximum time interval by which any one channel maintenance must be performed is the true channel maintenance window divided by the number of channels within the cluster. For example, if the channel maintenance window is 30 seconds, meaning that if a channel transmitted data for longer than 30 seconds, switched to a new channel and then tried to switch back to the original channel, a new channel setup would have to occur. If the channel cluster possesses three channels, the maintenance window is divided into three intervals of 10 seconds. Said another way, each channel is associated with a maximum channel maintenance interval of 10 seconds. Using this interval none of the three channels used to transmit data will exceed the 30 second maintenance interval and will therefore not require a new setup procedure.

Turning back to FIG. 5, at the expiration of the maximum channel maintenance interval 510 data services transmissions must be switched to another channel. Channel A 410 is transmitting data services. As the maintenance interval 510 expires, data services 450 transmissions are switched to channel B 420. At the outset of transmission on Channel B 420 a new channel maintenance interval is established. The duration of transmission of data services 450 on channel B 420 is again controlled by the length of the maximum channel maintenance interval 510, and in this example, transmissions are switched back to channel A 410 at the expiration of that interval.

Also shown in the first transmission of data services on channel B 420 is a beacon detection 520 and its associated interference time. As previously discussed, beacon signals are periodically issued, and when detected, signal the presence of other signals on the band. The instant a beacon is detected, an interference period is established. This interference time is the maximum period that data service transmissions may continue on the present channel before the channel must cease transmission and listen for MSF(s) or a beacon payload associated with the beacon.

To maintain data services transmission with substantially no degradation, a channel switch must occur when either the maximum maintenance interval is reached or the maximum interference time is reached. The third segment of data services transmission 450 shown in FIG. 5 occurs on channel A 410. Again a maintenance interval 510 is set for channel A 410. But in this instance, a beacon 520 is detected early within the data services transmission window and the interference time 530 becomes the driving criteria for switching channels.

Figure 6:
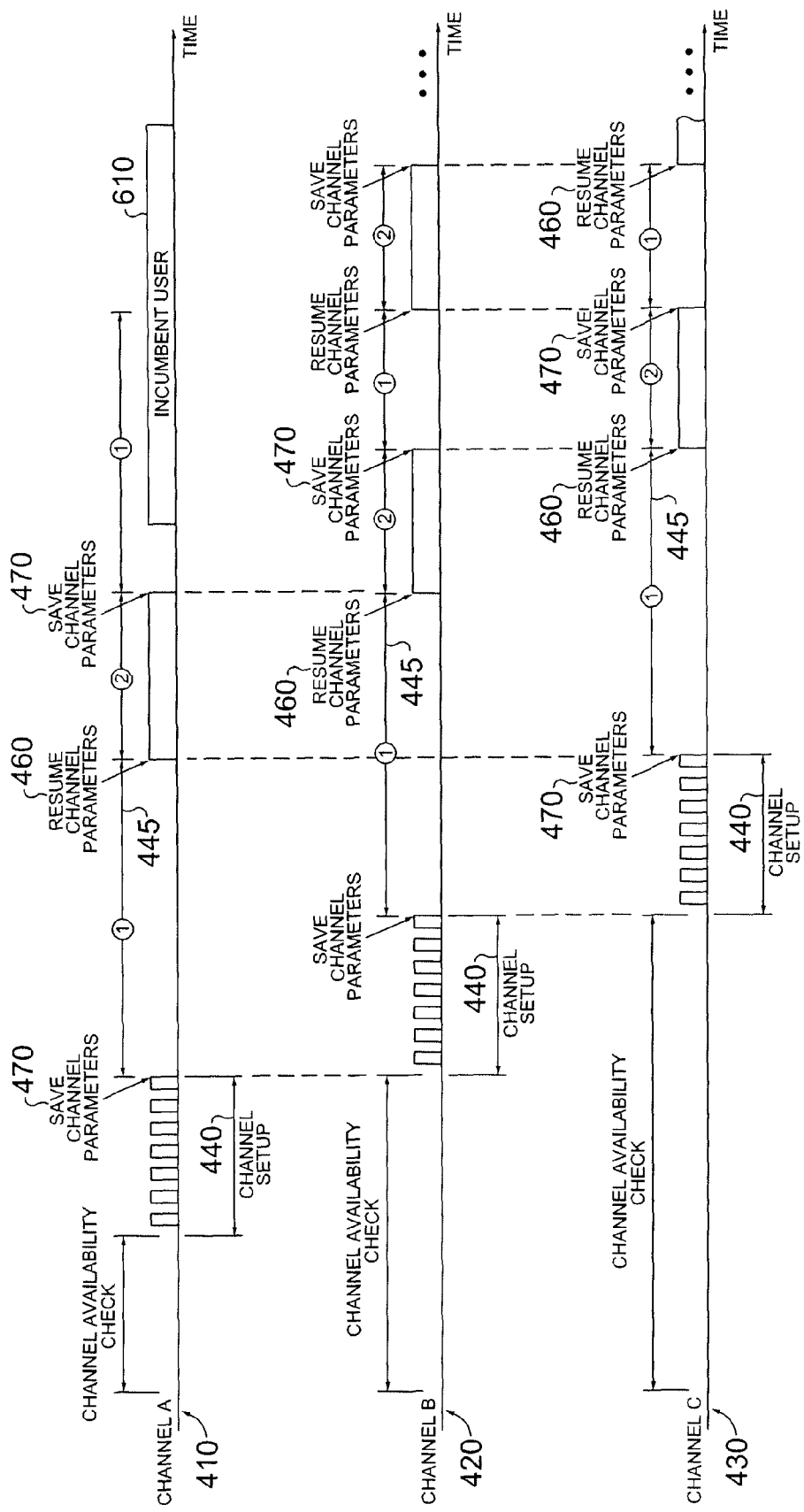
FIG. 6 shows the channel setup and zero-delay switching illustrated in FIG. 4 along with the presence of an incumbent signal, according to one embodiment of the present invention.

FIG. 6 shows the channel setup and zero-delay switching illustrated in FIG. 4 along with the presence of an incumbent signal, according to one embodiment of the present invention. As shown and described in conjunction with FIG. 4, three channels, channel A 410, channel B 420 and channel C 430, are set up 440 to accept and transmit data. After an initial sensing period 445, channel parameters for channel A 410 are retrieved from storage and restored 460 on channel A 410. Data services transmissions occur thereafter. After a period of time, determined as outlined above by the interaction between channel maintenance intervals and interference periods, the data service transmissions switch from channel A 410 to channel B 420.

Unlike the channel interaction shown in FIG. 4 and FIG. 5, FIG. 6 shows a scenario in which during a sensing period 445, the presence of an incumbent signal 610 is detected on channel A 410. According to one embodiment of the present invention the presence of an incumbent signal removes the channel from the channel cluster. Thus future data services transmissions are conducted on the remaining channels, in this case channel B 420 and channel C 430. As channel A 410 is no longer available for data services it is removed from the channel cluster. Accordingly the maximum channel maintenance interval is adjusted based on the number of remaining channels within the cluster. Should it be determined that there are not enough channels within the cluster to effectively and efficiently provide substantially continuous data services, one or more new channels, selected from the pool of available channels, can be added to the cluster. While data services are being transmitted using the existing channels within the cluster, the newly identified channels are set up and parameters stored. Once set up they are introduced into the switching order and the channel maintenance interval is appropriately adjusted.

Figure 7A:
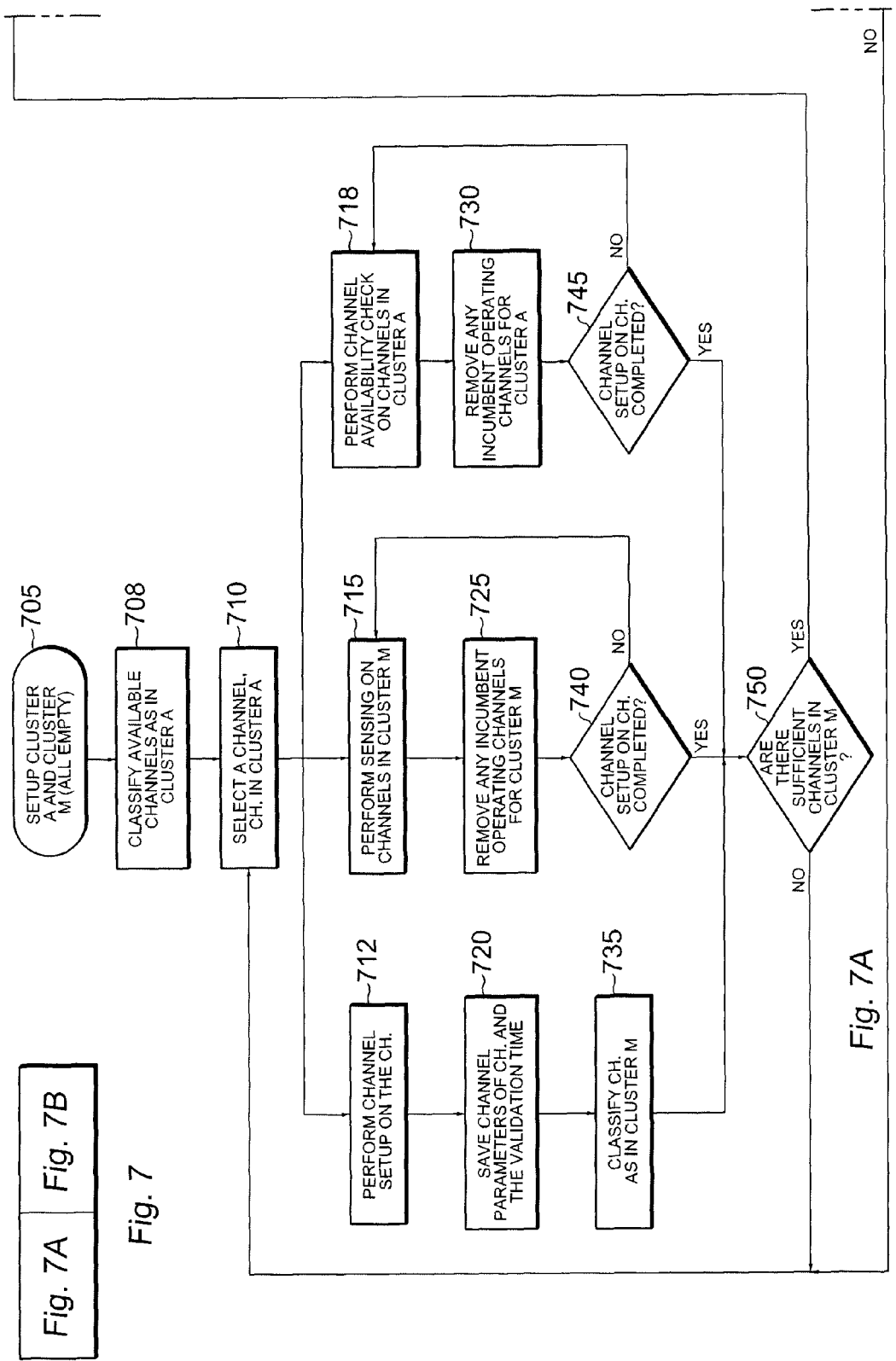
FIG. 7 is a flowchart for one method embodiment of cognitive zero-delay channel switching in a wireless network, according to the present invention.
Figure 7B:
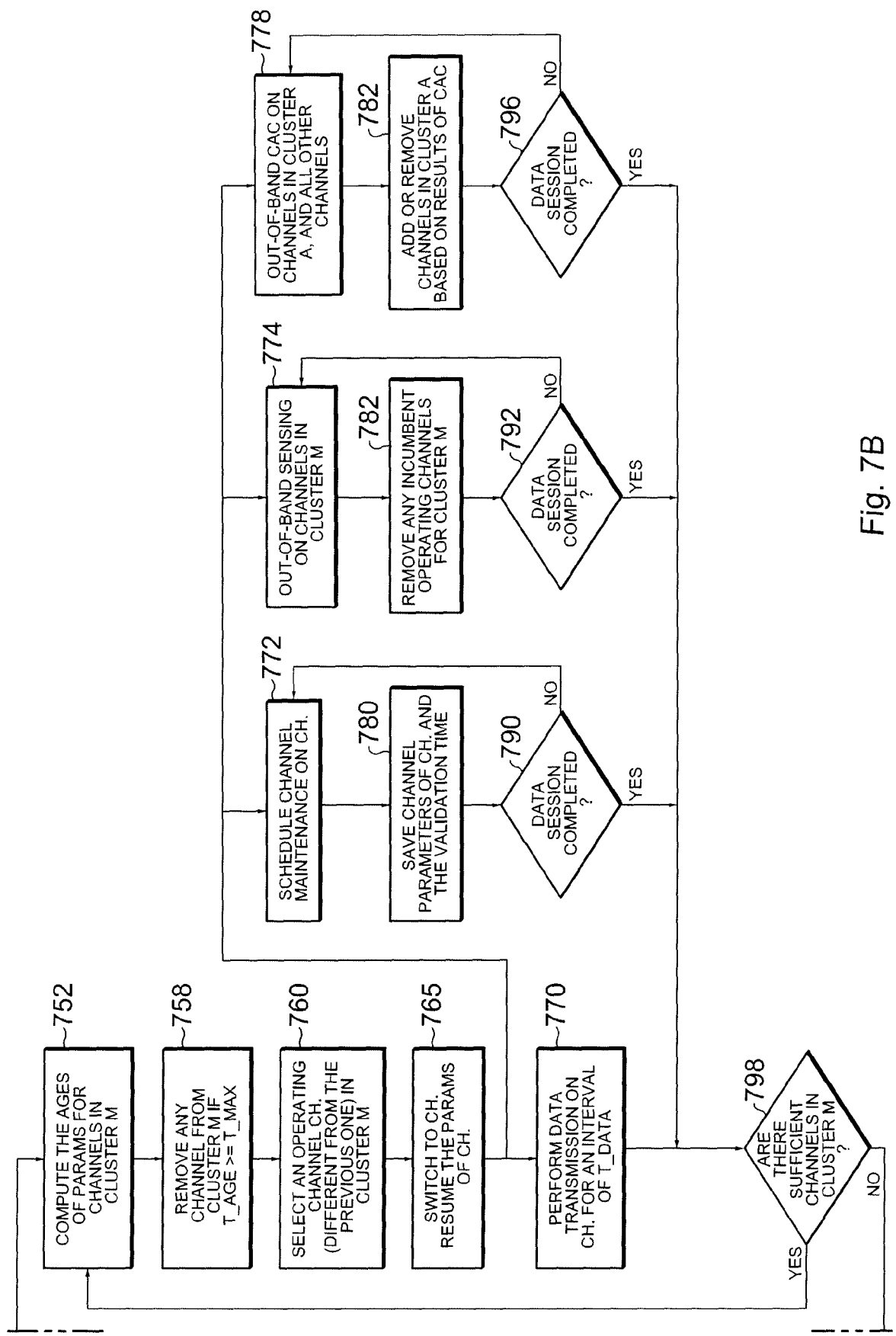

FIG. 7 is a flowchart illustrating methods of implementing an exemplary process for parallel data services and spectrum sensing with cognitive channel switching. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

According to one embodiment of the present invention, a method for cognitive channel switching for parallel data services begins with the formation 705 of two channel clusters, cluster A and cluster M. Cluster A is classified 708 as all available channels for use within the wireless network. From the channels within cluster A, a single channel is selected 710.

A channel setup procedure 712 is performed for the selected channel and the parameters saved 720 along with a validation time. Once the channel has been set up and the parameters saved, the channel is classified as belonging to cluster M 735. Thereafter a query is posed to determine 750 whether there are enough channels within cluster M. If the number is insufficient to support continuous transmissions of data services, the process repeats to identify and set up more channels. While this process continues, those channels within cluster M begin to perform sensing operations 715. Should one of the channels find an incumbent signal, that channel is removed from the cluster 725. If there are no incumbent signals sensed on the channel and the channel setup is complete 740, the process again queries whether sufficient channels exist in the M cluster.

While channels are being set up to join cluster M and sensing occurs on those channels already in channel M, an availability check is run 718 to maintain a list of available channels populating cluster A. If it is found that a channel in cluster A is associated with an incumbent signal, that channel is removed 730 from the cluster. This examination of cluster A continues until the channel setup is complete 745.

Eventually enough channels are set up and classified as being members of cluster M that the query to determine 750 whether there are sufficient channels to continuously transmit data services is returned with an affirmative answer. With the number of channels set the next step is to compute 752 the ages of the channel parameters for each channel in the cluster. Those channels associated with parameter ages exceeding a predetermined value are removed 758 from the cluster.

With a working set of channels now present in cluster M, an operating channel is selected 760. The selected channel is switched to and working parameters are restored 765. Thereafter data transmissions occur 770 on the channel for a set interval of time. As previously discussed, the interval of transmission is determined by the shorter of a maximum channel maintenance interval and an interference time limit. Again the question is posed whether there are enough channels in cluster M 798. If the answer is no, the process returns to the previous steps to add additional channels to the cluster. If not the channel switching process continues, driven by the set interval of time.

During the data session, scheduled channel maintenance is performed 772. Once complete the channels' parameters are again stored along with the parameters' validation time 780. When the data session is complete 790 the process asks if there are sufficient channels to continue 798, and when the answer is yes a channel switch is directed 765. At the same time one channel is conducting data transmission and channel maintenance, the other channels in cluster M are conducting out-of-band sensing 774. Should the sensing identify an incumbent signal, the channel associated with the incumbent signal is removed from cluster M 782. This sensing and removal process continues until the data transmission period is complete 792. As one or more channels may have been removed from the cluster, a query 798 is made whether sufficient channels are in the cluster to continue. When the answer is no, additional channels are added to the cluster. When the inquiry results in an affirmative response, a channel switch 765 is again directed.

Finally, while data transmissions are occurring on a channel within the M cluster and out-of-band sensing is occurring on the other channels in the M cluster, a channel availability check 778 is taking place in cluster A. Depending on the results of the check, channels are added or removed 785 from cluster A. This process is ongoing until the data session is complete 796.

The above described invention provides a method and system for parallel data services and spectrum sensing using cognitive channel switching. By employing the techniques presented herein, interruptions of data services are reduced to hardware switching delays rather than extensive delays caused by multiple channel moves and setups. [Delete some of the following paragraphs]

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

While there have been described above the principles of the present invention in conjunction with cognitive switching with respect to parallel data services in a wireless network it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A method for operating a cognitive radio network comprising:

initially assigning a collection of channels, allowed for use by the network, into an available cluster and an operational cluster based on sensing of the channels for incumbent users;

conducting channel setup for each channel within the operational cluster of channels;

saving channel parameters for each channel within the clusters of channels on a storage medium;

selecting a first operating channel from among the operational cluster of channels;

transmitting data services on the first operating channel and determining a period of time for transmission (PTT);

performing spectrum sensing on each remaining channel within the clusters of channels during the PTT;

updating during the PTT the assignments of channels to clusters;

switching to a second operating channel from among channels remaining in the operational cluster of channels upon completion of the PTT, resuming transmission of data services on the second operating channel, and determining a new PTT for the second channel, wherein prior to switching to the second operating channel, retrieving channel parameters associated with the second operating channel from the storage medium and instantiating the retrieved channel parameters on the second operating channel and subsequent to switching to the second operating channel, saving channel parameters associated with the second operating channel on the storage medium, and wherein a PTT on a channel is determined initially upon switching to said channel by setting the PTT to be the length of the channel maintenance interval of the network, but upon detection of a TG1 beacon during the PTT, resetting the remaining time of the PTT to be the smaller of the time remaining to the end of the PTT or the maximum interference period of the network.

2. The method of claim 1 further comprising restoring channel parameters for the first operating channel prior to transmitting data services.

3. The method of claim 1 wherein responsive to detecting an incumbent signal on a channel, removing the channel from the cluster of channels.

4. The method of claim 1 further comprising determining whether there are sufficient channels within the operational cluster of channels for transmitting data services.

5. The method of claim 4 responsive to determining if there are insufficient channels in the operational cluster of channels, selecting an additional channel from the available cluster to be added to the operational cluster of channels.

6. The method of claim 5 further comprising conducting a channel setup and saving channel parameters for the additional channel prior to adding the additional channel to the operational cluster of channels.

7. The method of claim 4 further comprising determining for each channel in the operational cluster the elapsed time since the parameters of the channel were measured, and removing the channel from the operational cluster if the elapsed time exceeds a maximum allowed valid time.

8. The method of claim 1 wherein the process of switching between channels within the operational cluster continues until the end of a data transmission interval or until there are insufficient channels in the operational cluster to continue the data transmission.

9. A system for a cognitive radio network comprising:

a first cluster of channels wherein each channel is available for use by the cognitive radio network;

a second cluster of channels selected from the first cluster and used for transmission of data services;

a channel setup module configured to set up each channel within the second cluster of channels;

a storage medium configured to store channel parameters for each channel within the clusters of channels;

a spectrum sensing device associated with each channel of both clusters wherein the spectrum sensing device senses an incumbent signal; and a channel switching module coupled to each channel within the second cluster of channels, wherein the channel switching module determines a PTT of data services, and wherein upon expiration of the PTT the channel switching module directs transmission of data services to switch to a second channel among the remaining channels within the second cluster of channels, wherein prior to directing transmission of data services to switch from the first channel to the second channel, the channel switching module retrieves channel parameters associated with the second channel from the storage medium and instantiates the retrieved channel parameters and wherein the channel switching module determines the PTT for a channel by initially upon switching to the channel by setting the PTT to be the length of the channel maintenance interval of the network, but upon detection of a TG1 beacon during the PTT, resetting the remaining time of the PTT to be the smaller of the time remaining to the end of the PTT or the maximum interference period of the network.

10. The system of claim 9 wherein the channel setup module determines whether there are sufficient channels within the second cluster of channels.

11. The system of claim 10 responsive to determining there are insufficient channels in the second cluster of channels, selecting an additional channel from the first cluster to be added to the second cluster of channels.

12. The system of claim 11 wherein the channel setup module determines and saves channel parameters for the additional channel prior to adding the additional channel to the second cluster of channels.

13. The system of claim 10 further comprising determining for each channel in the second cluster the elapsed time since channel parameters of the channel were measured, and removing a channel from the second cluster if the elapsed time of the channel exceeds a maximum allowed valid time.

14. The system of claim 9 wherein responsive to the spectrum sensing device detecting the incumbent signal on a channel, the spectrum sensing device removes the channel from the cluster of channels.

15. The system of claim 9 wherein subsequent to directing transmission of data services to switch from the first channel to the second channel, the channel switching module saves channel parameters of the first channel in the storage medium.

16. The system of claim 9 wherein the system continues switching between channels within the second cluster continues until the end of a data transmission interval or until there are insufficient channels in the second cluster to continue the data transmission.

17. A computer system for cognitive channel switching among a cluster of channels in a wireless network, the computer system comprising:
   a machine for executing instructions embodied as software; and
   a plurality of software portions, wherein
   one of said software portions is configured to conduct a channel setup for each channel within the cluster of channels;
   one of said software portions is configured to save channel parameters for each channel within the cluster of channels in a storage medium;
   one of said software portions is configured to select a first operating channel from among the cluster of channels;
   one of said software portions is configured to transmit data services on the first operating channel for a period of time of transmission PTT wherein the software portion determines the PTT for a channel initially upon switching to the channel by setting the PTT to be the length of the channel maintenance interval of the network, but upon detection of a TG1 beacon during the PTT, resetting the remaining time of the PTT to be the smaller of the time remaining to the end of the PTT or the maximum interference period of the network;
   one of said software portions is configured to perform spectrum sensing on each remaining channel within the cluster of channels during the period of time to detect an incumbent signal; and
   one of said software portions is configured to switch to a second operating channel from among channels remaining in the cluster of channels upon completion of the period of time,
   wherein prior to switching to the second operative channel, one of said software portions is configured to retrieve channel parameters associated with the second operating channel from the storage medium and instantiating the retrieved channel parameters on the second operating channel.

18. The computer system of claim 17 wherein responsive to detecting an incumbent signal on a channel, one of said software portions is configured to remove the channel from the cluster of channels.

19. The computer system of claim 17 wherein subsequent to switching from the first operating channel to the second operating channel, one of said software portions is configured to save channel parameters associated with the first operating channel on the storage medium.

* * * * *